J. L. GILLERAN.
TEMPLE ROLL BRACKET.
APPLICATION FILED FEB. 9, 1920.
1,374,074.
Patented Apr. 5, 1921.
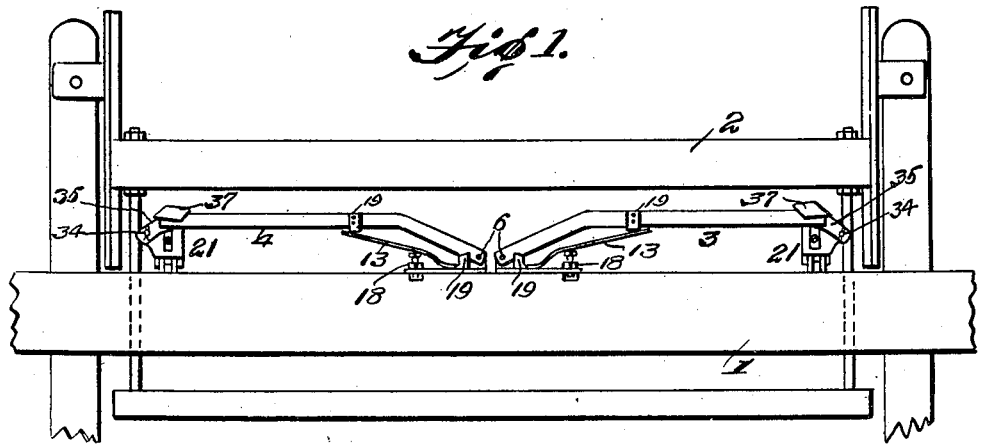
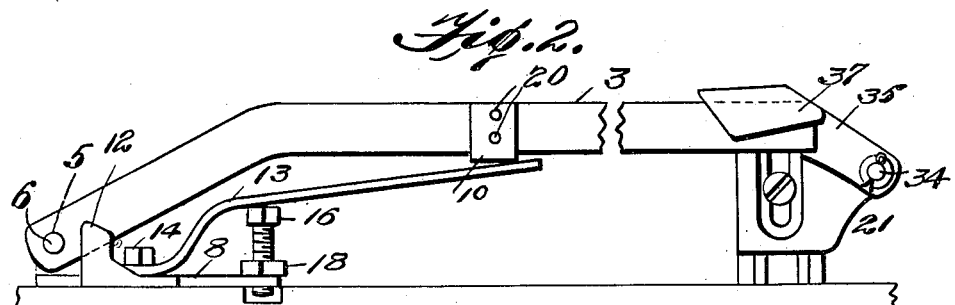
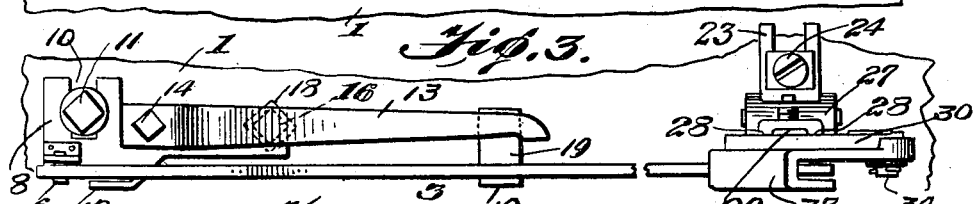
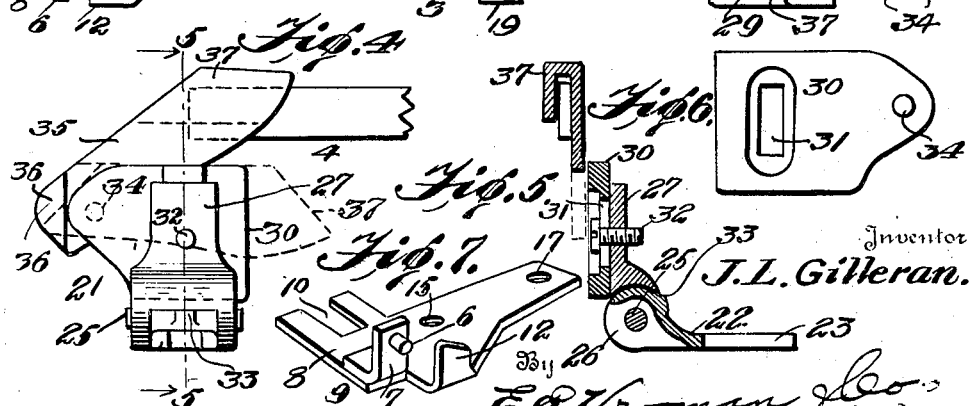
Inventor
J. L. Gilleran.

UNITED STATES PATENT OFFICE.

JOSEPH L. GILLERAN, OF PLAINFIELD, CONNECTICUT.

TEMPLE-ROLL BRACKET.

1,374,074.  Specification of Letters Patent.  Patented Apr. 5, 1921.

Application filed February 9, 1920. Serial No. 357,135.

*To all whom it may concern:*

Be it known that I, JOSEPH L. GILLERAN, a citizen of the United States, residing at Plainfield, in the county of Windham and State of Connecticut, have invented certain new and useful Improvements in Temple-Roll Brackets, of which the following is a specification, reference being had therein to the accompanying drawings.

This invention relates to improvements in looms and more particularly to an improved temple rod and its accessories for looms, particularly designed for use in connection with woolen looms or large and heavy cotton looms used for making automobile tire duck and other heavy fabrics.

The principal objects of the invention are to provide safety for the hands of the operators of such looms and to avoid the mangling of hands of operators when they are placed upon the inner bracket or the outer bracket which holds the temple rod, and avoiding the hand being crushed between the inner bracket and the lathe or race and between the outer bracket and the lathe or race.

With these and other objects in view, my invention comprises certain novel combinations, constructions and arrangements of parts as will be hereinafter described, illustrated in the accompanying drawings, and more particularly pointed out in the appended claims.

In the drawings:

Figure 1 is a plan view of the device secured to the rear face of the breast-beam.

Fig. 2 is an enlarged plan view of the single temple device.

Fig. 3 is a detailed view of the device when turned forward 90°.

Fig. 4 is a rear view in elevation of the outer bracket and catch device, associated with the outer end of the temple rod.

Fig. 5 is a sectional view taken on line 5—5, Fig. 4, and looking in the direction of the arrows.

Fig. 6 is a plan view of the adjustable plate of the bracket and catch device.

Fig. 7 is a perspective view of the inner bracket device, to which the inner end of the temple rod is attached.

Referring to the drawings by numerals, 1 designates the breast beam or support, and 2 is a race or lathe of the loom. Mounted upon the breast beam or support 1 are two of my improved temple rods and their accessories or coöperating parts. It will only be necessary to specifically describe one of the temple rods and its coöperating parts, for the only difference is that the rod 3 is a right-hand rod and the rod 4 is a left-hand rod. The temple rod 3 (or 4) is bent downwardly near its inner end and is pivoted, at 5, upon the stub shaft 6, formed upon the angle bracket 7, carried by the base plate 8 of the inner bracket device 9. Each rod 3 is supplied with a removable temple roll 3ª. The plate 8 is bifurcated, at 10, so as to receive the retaining bolt 11, carried by the support 1. An upstanding right-angular-positioned lug 12 is formed on plate 8 parallel with the upstanding portion of the angle bracket 7, and this lug 12 acts as a guard for retaining the temple rod 3 upon the stub shaft 6, when in the operative position shown in Figs. 1, 2 and 3.

A comparatively long angle spring 13 is bent down at its inner end against plate 8 and the bolt 14 extends into the aperture 15 of the plate 8, retaining the spring in a fastened position upon the plate. An adjusting bolt 16 is extended into the aperture 17, of plate 8, and a locking nut 18 is threaded on bolt 16 to retain the bolt in an adjusted position against the under face of spring 13, to control its tension and thereby its pressure against the under portion of the angle bracket 19 fastened, at 20, to the side of the temple rod 3; this angle bracket 19 extends under the rod 3 and across the top of the spring 13; this spring 13 holds the temple rod up in its highest position, but yet permitting a downward or yielding movement of the rod 3, upon the stub shaft 6 when undue pressure is brought to bear upon the rod.

The outer bracket and catch device 21 comprises a base plate 22 provided with a bifurcation 23, within which bifurcation 23 is positioned the locking device 24, preferably a screw or bolt. Pivotally mounted, at 25, upon the hub 26 of the plate 22 is an upper movable plate 27, which plate 27 has lips 28, straddling a rib 29, formed on the adjustable plate 30. The adjustable plate 30 is provided with an elongated aperture 31, through which aperture extends the screw 32, Fig. 5, that adjustably fastens the plate 30 upon the upper plate 27. It is to be noted that the base plate 22 is provided with a lug 33 that limits the rearward pivotal movement of the upper plate 27 upon the hub 26.

A stub shaft 34 is formed upon the adjustable plate 30 near one end, and pivotally mounted upon the stub shaft 34 is a catch 35. This catch is provided with a lug 36 that limits the upward pivotal movement of the catch; the upper end of the catch is provided with a hook 37 that normally rests over the outer end of the temple rod 3, so that the temple rod will be retained in position, and still the temple rod can be depressed, the outer end of the catch 35 swinging downward with the temple rod and, yet, as soon as pressure is removed off the rod, the spring 13 will cause it to move its approximately normal horizontal position and the lug 36 on the catch 35 will prevent any further upward movement of the temple rod.

It is to be noted that, at the inner end of the temple rod, there is sufficient room, if the operator's hand is upon the inner portion of the rod, to prevent the hand being jammed, when the inner end of the rod moves toward the lathe or race.

At the outer end of the temple rod, the operator's hand cannot be injured, during the operation of the loom, for the outer bracket and catch device 21 will close or double up by virtue of its structure, consequently, preventing the operator's hand from being injured when the outer end of the device comes up against the lathe or race.

While I have described the preferred embodiment of my invention, and have illustrated the same in the accompanying drawings, in the extensive manufacture of my improvement, certain minor changes or alterations may appear to one skilled in the art to which this invention relates and I, therefore, reserve the right to make such alterations or changes as shall fairly fall within the scope of the appended claims.

What I claim is:

1. In a loom, the combination with a support, of a movable temple rod carried by said support, an outer bracket and catch device contiguous to said rod, said device comprising a plate and a pivoted catch mounted on said plate, said catch provided with means engaging and holding a portion of the temple rod, and said catch provided with means for limiting its movement upon the plate and thereby limiting the movement of the temple rod in one direction.

2. A bracket and catch device for temple rods comprising a bifurcated base plate, an upper plate pivotally mounted upon said base plate, an adjustable plate carried by said upper plate, and a catch pivotally mounted upon said adjustable plate.

3. A bracket and catch device for temple rods comprising plates hinged together, an adjustable plate mounted upon one of said hinged plates, and a catch provided with a stop for limiting its pivotal movement upon the adjustable plate and also provided with a hood or hook for covering or straddling a portion of a temple rod.

4. A bracket and catch device for temple rods comprising a two-part hinged structure, an adjustable plate mounted upon said two-part hinged structure, and catch and limiting means movably mounted upon said adjustable plate.

5. A bracket and catch device for temple rods comprising a base plate provided with a bifurcation and with a hub, an upper plate pivotally mounted upon the hub of the base plate, an adjustable plate provided with an elongated aperture engaging the upper plate, said adjustable plate provided with a rib, said upper plate provided with lips surrounding the rib of the adjustable plate, a screw in the aperture of the adjustable plate and fastening the plate in an adjusted position upon the upper plate, a stub shaft formed upon said adjustable plate near one end, a catch pivotally mounted upon said stub shaft, said catch provided with a lug on one end for limiting the pivotal movement of the catch on the stub shaft, and said catch provided with an upper hook end adapted to partly surround or straddle a temple rod, substantially as shown and described.

In testimony whereof I hereunto affix my signature.

JOSEPH L. GILLERAN.